Jan. 9, 1940.  G. E. HULL ET AL  2,186,676
VEHICLE VELOCITY CHANGE TESTING
Filed Oct. 21, 1937   2 Sheets-Sheet 1
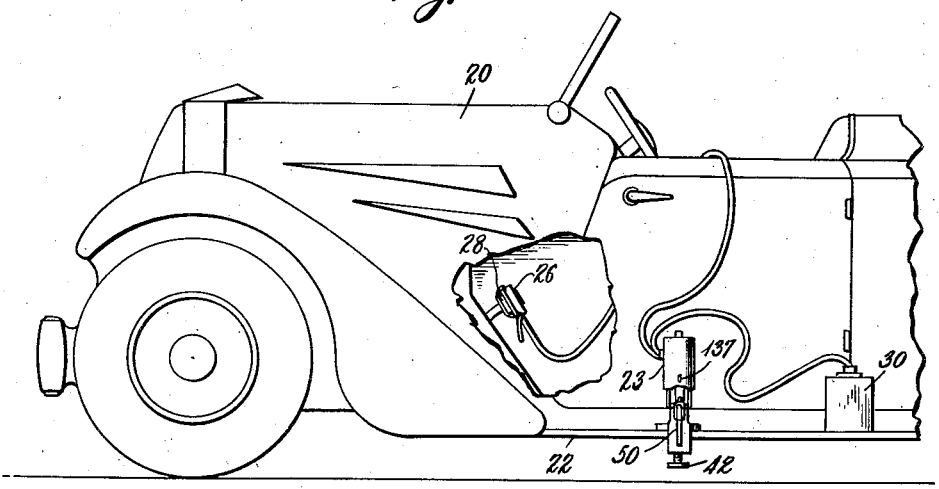
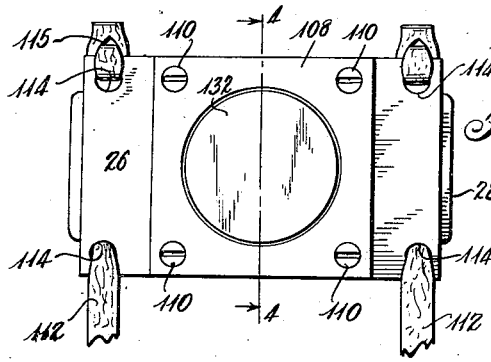
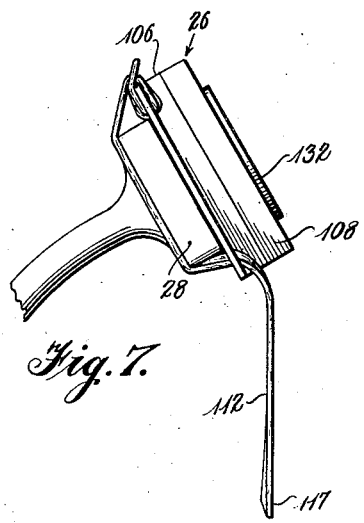
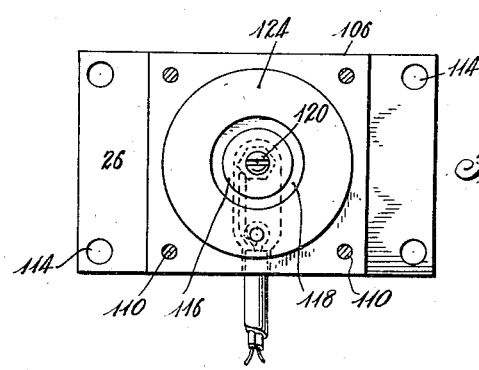
Inventors
George E. Hull and
James G. Christhilf
By Raymond W. Colton
Attorney Jan. 9, 1940.     G. E. HULL ET AL     2,186,676
VEHICLE VELOCITY CHANGE TESTING
Filed Oct. 21, 1937     2 Sheets-Sheet 2
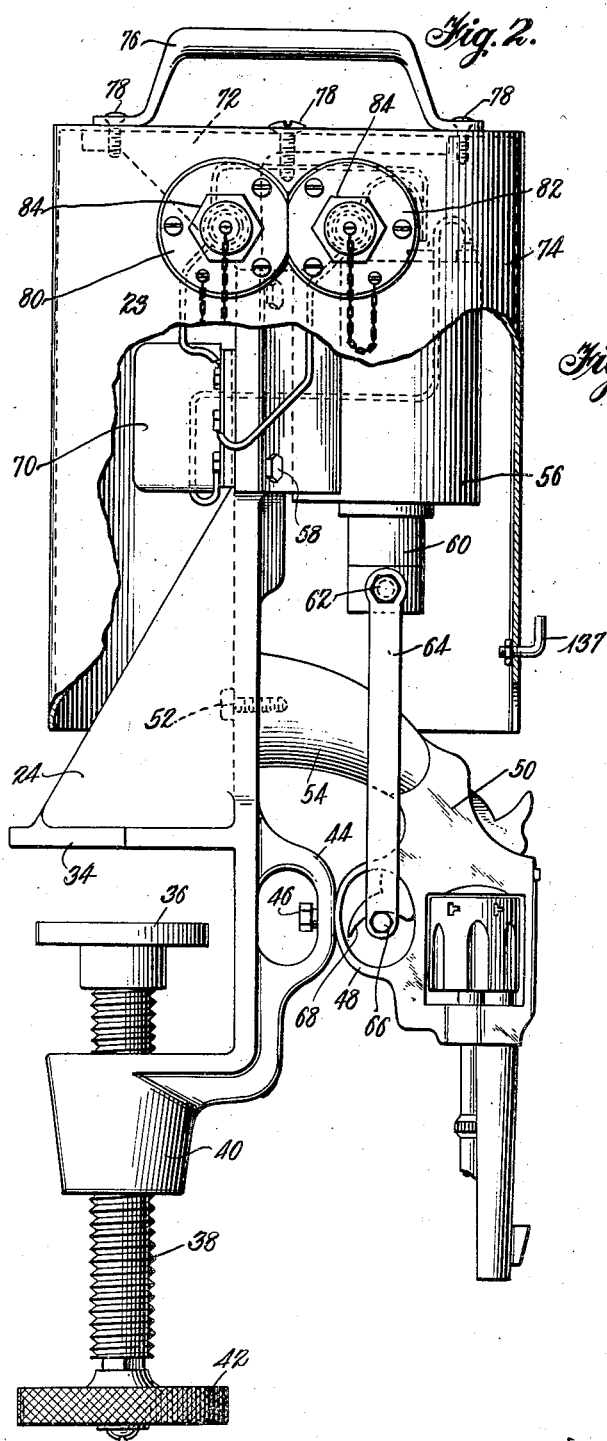
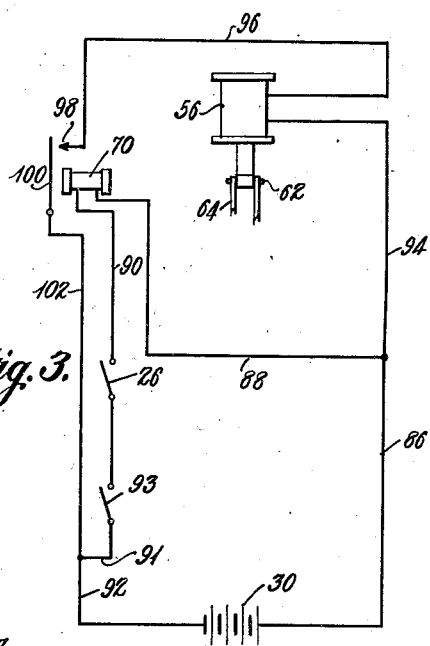
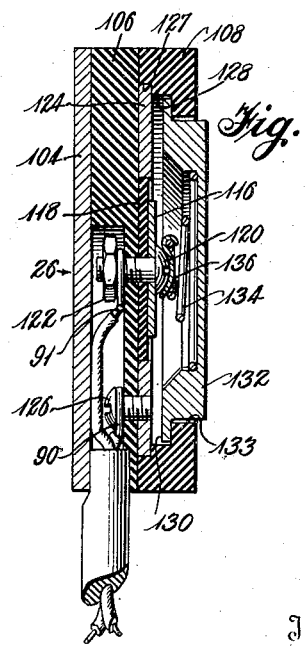
Inventors
George E. Hull and
James G. Christhilf
By Raymond W. Colton
Attorney Patented Jan. 9, 1940

2,186,676

UNITED STATES PATENT OFFICE 2,186,676

VEHICLE VELOCITY CHANGE TESTING

George E. Hull and James G. Christhilf, Baltimore, Md., assignors of one-half to Fred L. Hall, Bergen County, N. J.

Application October 21, 1937, Serial No. 170,280

10 Claims. (Cl. 73—51)

The present invention relates to testing apparatus adapted for use in the measurement of positive or negative acceleration of moving bodies.

Many systems and methods have been devised in the past for determining the acceleration and deceleration of vehicles, intended in most cases for the testing and adjustment of the vehicle brakes as well as to determine their effectiveness and compliance with police regulations. The developments in brake testing devices have followed two general trends, one type being designed for use with a vehicle under normal operating conditions and the other for stationary installations. As the result of extensive research, it has been found that the brake testers of the stationary type are quite inaccurate since the testing conditions of a vehicle at rest depart too far from those encountered in normal operation.

Experiments with the inertia type of brake tester, designed for use with moving vehicles and commonly used by local police departments in testing vehicle brakes, have produced results varying forty percent or more from actual measurements of the true distance required for bringing the vehicle to a standstill. Brake testers of other types have been found to be equally inaccurate and consequently inadequate to cope with the increasingly important problems connected with acceleration, deceleration and other characteristics of vehicles.

By the present invention, it is proposed to avoid the disadvantages inherent to known devices for similar purposes, and to provide apparatus primarily directed at the precise determination of the speed changes of moving bodies. The present invention has been developed upon the principle that if the point at which a speed change initiates is known and the point at which the speed change terminates is also known, a mere measurement of the distance between the two points results in the numerical value of the distance over which the speed change took place. If, for example, while a vehicle is travelling at the rate of thirty miles per hour, the brake pedal is applied and the road surface is simultaneously marked from a fixed point on the vehicle, the distance between the mark and where the fixed point of the vehicle comes to rest gives the most direct and accurate measurement of the distance required for stopping the vehicle.

There are of course many possible ways for placing a mark upon a road surface simultaneously with the actuation of a vehicle brake pedal, but since brake testing apparatus will be applied to a vehicle only temporarily in most cases, it is advantageous that it be rather compact, light in weight and readily attachable to and detachable from the vehicle. The same principles of marking a surface for the measurement of distances and/or changes in speed are applicable to the testing of other instrumentalities of a vehicle. For example, the apparatus may be used in testing the performance of vehicle engines, speed change gears, differentials, etc., as well as the reaction time and alertness of a person operating such a vehicle.

Whereas it might be said that the fundamental purpose of the present invention relates to the marking of a surface over which a vehicle is travelling upon the actuation of a speed changing element or upon the application of a speed changing force, certain specific steps and apparatus for carrying out the invention are also of importance. While in the testing of brakes, the marking device is preferably actuated simultaneously with the application of the brakes, or the actuation of the brake operator, for making other measurements, it is contemplated that the marking device be actuated at a predetermined speed or speeds of the vehicle from a moving part thereof or from an auxiliary source carried by the vehicle, by the shifting of a speed change lever, by operation of a clutch, by a timing mechanism, etc. As a preferred method of marking a surface over which the vehicle is operating in accordance with the present invention, a gun or fire arm containing a pigmented projectile is detachably secured to a portion of the vehicle and has its trigger interconnected by a yoke or other mechanism with an electromagnet, which electromagnet may be connected through a relay to a source of current and an actuating switch. The switch as indicated above, being closed upon the application of the brakes, upon the vehicle attaining a predetermined speed, at intervals by means of a timing mechanism, by actuation of the gear shift lever from one speed ratio to another, upon engagement or disengagement of the clutch, etc., depending upon the particular measurement desired. Where a particular test necessitates a plurality of marking operations, the firearm employed will preferably be of the repeating type In order to assure instant energization of the electromagnet upon the application of the speed changing force, the entire apparatus including the switch should be efficiently designed. In order to close the circuit at the proper time, the switch construction should not introduce excessive friction or other retarding effects. When the apparatus of the present invention is employed in the testing of brakes, the switch may be applied to the upper surface of the brake pedal by readily detachable means so that the foot of the operator will depress the pedal and close the switch simultaneously, thus assuring that the roadway will be marked at the same moment that the brake is applied.

The principles of the present invention and its possible modes of application will be better understood when more completely described in conjunction with the attached drawings.

In the drawings:

Fig. 1 is an elevation partly broken away illustrating the application of the present invention to the testing of automobile brakes;

Fig. 2 is an elevation partly broken away illustrating the marking device of the present invention;

Fig. 3 is a circuit diagram;

Fig. 4 is a sectional elevation taken along line 4—4 of Fig. 5;

Fig. 5 is a plan of the switch as applied to a brake pedal;

Fig. 6 is a plan of the switch with its upper casing section removed; and

Fig. 7 is an end view showing the switch applied to a vehicle brake pedal.

The apparatus has been depicted in Fig. 1 as applied to an automobile for determining the condition of its brakes.

An automobile 20, of usual construction, has a running board 22 upon which the marking device 23 of the present invention is detachably clamped in a suitable manner. The actuating mechanism for the marking device includes a switch 26 detachably mounted upon the brake pedal 28 of the vehicle and a source of current 30 which may be carried at a suitable point within or outside of the vehicle body.

The marking device as shown on a larger scale in Fig. 2, includes a cast or otherwise constructed frame 24 provided at its lower end with a fixed jaw 34 and an adjustable jaw 36 constituting a clamp or attaching means. The adjustable jaw 36 is swivelly mounted upon the upper end of a screw 38 whose thread is received in an internally threaded boss 40 formed at the lowermost portion of the frame. The lower end of the screw carries a hand wheel 42 for clamping or unclamping the device with respect to a support such as the running board of a motor car.

The frame 24 is provided on its opposite side and somewhat above the clamping structure with a perforated portion 44 of ring-like contour for the reception of a bolt 46 adapted to be threaded into suitably formed threads in the trigger guard 48 of a gun or firearm 50 for securing the latter to the frame. The firearm depicted in the drawings is of the repeating type known as a revolver. The gun is fastened to the frame at another point by means of a screw 52 extending through the frame and threaded into the grip 54 of the pistol as clearly shown in Fig. 2.

The upper end of the frame 24 supports an electromagnet 56 suitably attached by means of screws 58. The electromagnet is provided with a telescoping armature 60, the lower end of which supports a pivot pin 62 to which a pair of links 64 are pivoted, the lower ends of the links being likewise provided with a pin 66 and thus defining a yoke, for engagement with the trigger 68 of the gun 50.

The frame 24 also carries a relay 70 which is electrically connected with the electromagnet by suitable conductors, leads also being provided on the relay and electromagnet for connection with outlets leading to the actuating switch 26 and the source of current 30.

The uppermost end of the frame 24 is provided with a flange 72 for supporting a hood or cover 74. A handle 76 is likewise connected by screws 78 with the frame and hood to facilitate transportation of the device. Electrical outlets 80 and 82 of the marine type are mounted on the hood 74 for the reception of suitable plugs used in interconnecting the relay and electromagnet with the switch and source of current. These outlets are provided with the usual screw caps 84 to protect the terminals against the elements.

The electrical connections are diagrammatically shown in Fig. 3 of the drawings wherein the relay circuit includes the battery 30, a current supply lead 86, a lead 88 connecting the current supply lead to the relay, the winding of the relay 70, a lead 90 extending from the relay to the switch 26, the terminals of switch 26, a lead 91 extending from one side of the switch, and a lead 92 extending to the opposite terminal of the battery. A control switch 93 may be connected in series with the pedal switch 26 to render the circuit inoperative as long as desired. The electromagnetic circuit includes the battery 30, a lead 86, a lead 94 running from supply lead 86 to the magnet, the winding of electromagnet 56, a lead 96 connecting the magnet winding with the relay, the relay contacts 98 and 100, a return lead 102 and the lead 92 extending to the opposite terminal of the battery.

The switch 26 shown in Figs. 4 to 7 inclusive comprises a base plate 104, a lower casing section 106 and an upper casing section 108. The upper and lower casing sections are assembled upon the base plate by suitable screws 110, and the base plate supporting these sections, and the contained switch mechanism, is adapted for ready attachment to a brake pedal 28, as particularly shown in Figs. 5 and 7.

For attaching the switch assembly to the brake pedal or other portion of a vehicle, a pair of thongs 112 or the like may be employed in cooperation with a series of apertures 114 formed in the base plate. Each of these thongs 112 is provided with a split 115 near one of its ends and has its free end 117 threaded through the split and through one of the said apertures 114. As clearly shown in Fig. 7, the free end of the thong is also threaded through a second one of the apertures so that by embracing the brake pedal by the loops thus formed and drawing the thongs tight, the switch will be held upon the upper surface of the brake pedal. The width of each thong is preferably greater than the diameter of the apertures in the switch base plate.

The lower casing section of the switch is provided with a centrally located disc of conductive material 116, spaced from the casing section by a slightly larger insulating disc 118, which discs are fastened to the lower casing section by means of a screw 120, the threaded end of which receives one of the circuit conductors 91 which is fastened thereto by means of a nut 122. Surrounding the central contact disc, and in stepped and spaced relation thereto, there is provided a contact annulus 124 also mounted on the lower casing section 106 and fastened thereto by means of a suitable screw 126 which simultaneously serves as a terminal for one of the circuit conductors 90.

The upper casing section is provided with a counterbore 127 to register with the outer periphery of the annulus 124, and with a second counterbore 128 cooperating with and retaining a flange 130 formed on the inner end of the switch push button 132. The outer end of the push button projects through and is freely movable in an aperture 133 formed in the upper casing section 108. The push button is normally held in spaced relation with respect to the contact annulus 124 by means of a frustroconical spring 134 having its larger base seated in a counterbore fashioned in the push button, and its smaller base received by a curved plate 136 whose concave surface rests upon the convex head of the screw 120.

Accordingly, the push button will be maintained in contact with the central disc contact, but will complete the electrical circuit only when depressed sufficiently to contact the annular contact. By thus providing sufficient freedom of motion, the push button effectively makes the circuit whether it is depressed centrally or at its periphery.

The mode of operation of the system will follow readily from the foregoing description. After the apparatus has been applied to a vehicle in the manner as generally shown in Fig. 1, with the electromagnetic and gun mechanism clamped to the vehicle running board, the switch attached to the brake pedal and the circuit connections with the source of current completed, the apparatus is ready for use.

The vehicle may be brought to a desired speed, say thirty miles per hour and at the desired moment, the operator will depress the brake pedal to apply the brakes. Simultaneously, the switch will close the relay circuit which will in turn close the electromagnetic circuit, actuating the trigger of the gun in a minimum elapsed time. Accordingly, the gun will fire substantially simultaneously with the application of the brakes and the road surface will be suitably marked.

The projectiles used may appropriately comprise a pigment material so as to indicate the point of application clearly and precisely. The pigment may be suitably bound if desired by any well known binding material.

After the vehicle has come to rest, measurement from the mark on the road surface to a point on the road surface directly under the muzzle of the gun will give the actual distance required for stopping the vehicle. In order to facilitate such measurement, a hook 137 is provided on the hood in alignment with the muzzle or sights of the gun, for reception of the loop of a measuring tape. Accordingly, only one inspector will be required, since he can support the loop end of the tape on the hook 137 and measure to the point of the road surface at which the mark was made.

As already stated, the circuit could be closed by the operation of speed control elements other than the brake pedal, in a manner which will suggest itself to a skilled mechanic. Accordingly, the present invention is not to be limited with regard to method or apparatus beyond the scope of the appended claims.

We claim:

1. In combination with a vehicle brake mechanism, a brake lever, an electric switch carried by said lever and adapted to close a circuit upon application of the brake, an electromagnet and a source of current in said switch circuit, and means actuated upon energization of said electromagnet to mark a surface over which the vehicle travels.

2. In combination with a vehicle, a vehicle speed control element, a device carried by said vehicle for emitting a pigmented substance to mark a surface over which the vehicle operates, and means interconnecting said speed control element with said marking device for emitting said pigmented marking substance to said surface responsive to operation of said speed control element.

3. In combination with a vehicle, a vehicle speed control element, a device carried by said vehicle for marking a surface over which the vehicle operates, a circuit including an electromagnet for actuating said device, a source of current and circuit closing means responsive to operation of said speed control element.

4. In combination with a vehicle, a brake applying lever, a device carried by said vehicle for marking with a pigmented substance a surface over which the vehicle operates and means interconnecting said device and lever for actuating said device upon operation of said brake applying lever.

5. In combination with a vehicle, a brake applying lever, a device detachably carried by said vehicle for projecting a marking substance upon a surface over which the vehicle operates, and means effective upon application of said lever to actuate said projecting device.

6. In combination with a vehicle, a brake applying lever, a gun carried by said vehicle adapted to project a marking substance upon a surface over which the vehicle operates upon application of said lever, an electro-magnetic trigger actuator for said gun, a source of current in circuit with said actuator, and a switch adapted to close said circuit upon application of said lever.

7. In combination with a vehicle, a speed controlling lever, a gun adapted to project a marking substance upon a surface over which the vehicle operates upon application of said lever, an electromagnet for actuating said gun, and a circuit including said electromagnet, a source of current and a switch actuated by said lever.

8. In combination with a vehicle, a speed controlling lever, a gun supported by the vehicle and adapted to fire a projectile upon application of said lever to work a surface traversed by said vehicle, an electromagnetic circuit for actuating said gun, a relay circuit for controlling said electromagnetic circuit, and a switch in said relay circuit actuated upon operation of said lever.

9. In combination with an automotive vehicle, a brake pedal, a foot actuated electrical switch detachably fastened to the surface of said brake pedal, a gun detachably mounted on said vehicle having a downwardly directed muzzle and a trigger, electromagnetic actuating means for said trigger, and a circuit including a source of current, said switch and said electromagnetic actuating means.

10. In combination with a vehicle, a speed controlling lever, a gun mounted on said vehicle adapted to mark a surface with respect to which the vehicle moves upon application of said lever, a pigmented projectile for said gun, and means interconnecting said lever and gun for actuating the latter.

GEORGE E. HULL.
JAMES G. CHRISTHILF.

CERTIFICATE OF CORRECTION.

Patent No. 2,186,676. January 9, 1940.

GEORGE E. HULL, ET AL.

It is hereby certified that error appears in the printed specification of the above numbered patent requiring correction as follows: Page 3, second column, line 52, claim 8, for the word "work" read mark; and that the said Letters Patent should be read with this correction therein that the same may conform to the record of the case in the Patent Office.

Signed and sealed this 13th day of February, A. D. 1940.

(Seal)

Henry Van Arsdale,
Acting Commissioner of Patents.